(12) United States Patent
Rozmarynowski

(10) Patent No.: US 9,636,768 B2
(45) Date of Patent: May 2, 2017

(54) DEVICES AND METHODS FOR PROVIDING INFORMATION ON A TORCH

(71) Applicant: Hobart Brothers Company, Troy, OH (US)

(72) Inventor: Scott Ryan Rozmarynowski, Greenville, WI (US)

(73) Assignee: HOBART BROTHERS COMPANY, Troy, OH (US)

( * ) Notice: Subject to any disclaimer, the term of this patent is extended or adjusted under 35 U.S.C. 154(b) by 661 days.

(21) Appl. No.: 13/714,801

(22) Filed: Dec. 14, 2012

(65) Prior Publication Data

US 2014/0166631 A1    Jun. 19, 2014

(51) Int. Cl.
| | |
|---|---|
| *B23K 5/00* | (2006.01) |
| *B23K 9/00* | (2006.01) |
| *B23K 10/00* | (2006.01) |
| *B23K 11/00* | (2006.01) |
| *B23K 28/00* | (2006.01) |
| *B23K 9/32* | (2006.01) |

(52) U.S. Cl.
CPC .............. *B23K 10/00* (2013.01); *B23K 9/32* (2013.01); *B23K 28/00* (2013.01)

(58) Field of Classification Search
CPC . B23K 5/00; B23K 9/00; B23K 10/00; B23K 11/00; B23K 13/00
USPC ....... 219/54–78.15, 108–109, 121.13–121.4, 219/121.45
See application file for complete search history.

(56) References Cited

U.S. PATENT DOCUMENTS

| | | | |
|---|---|---|---|
| 4,182,949 A | 1/1980 | Powers | |
| 4,389,561 A | 6/1983 | Weman et al. | |
| 4,484,059 A | 11/1984 | Lillquist | |
| 5,571,431 A | 11/1996 | Lantieri et al. | |
| 5,837,966 A * | 11/1998 | Timmons, Jr. | 219/124.34 |
| 5,869,801 A * | 2/1999 | Paton et al. | 219/121.12 |
| 6,130,407 A | 10/2000 | Villafuerte | |
| 6,315,186 B1 | 11/2001 | Friedl et al. | |
| 6,420,672 B1 * | 7/2002 | Ulrich et al. | 219/121.39 |
| RE40,212 E * | 4/2008 | Watanabe et al. | 700/262 |
| 7,683,290 B2 * | 3/2010 | Daniel et al. | 219/130.01 |
| 7,962,967 B2 * | 6/2011 | Becker et al. | 2/8.1 |
| 8,350,182 B2 * | 1/2013 | Shipulski et al. | 219/121.48 |
| 2005/0077270 A1 * | 4/2005 | Sommerfeld et al. | 219/121.39 |
| 2005/0247686 A1 * | 11/2005 | Child | 219/124.34 |
| 2007/0051711 A1 | 3/2007 | Kachline | |
| 2007/0086508 A1 * | 4/2007 | Reading et al. | 374/208 |
| 2008/0149602 A1 | 6/2008 | Lenzner et al. | |
| 2008/0169277 A1 * | 7/2008 | Achtner et al. | 219/136 |

(Continued)

FOREIGN PATENT DOCUMENTS

GB    2454232    5/2009

OTHER PUBLICATIONS

LN-25 Pro Technical Brochure, Lincoln Electric Co., Jan. 2009, 4 pgs. http://www.google.ca/url?sa=t&rct=j&q=&esrc=s &source=web&cd=1&cad=rja&uact=8&ved=0CB4QFjAA &url=http%3A%2F%2Fwww.lincolnelectric.com.au%2Ffile_ reader%2F%3Foriginal_ file%3D0ab922ba3e948387b4b2a85fcb83d194-1. pdf%26filename%3DLN-25_PRO_inc_Magnum-4186-.

*Primary Examiner* — Michael LaFlame, Jr.
(74) *Attorney, Agent, or Firm* — Fletcher Yoder P.C.

(57) ABSTRACT

A torch for a welding or plasma cutting operation configured to provide information. The torch includes a torch body. The torch also includes indicators coupled to the torch body and (Continued)

control circuitry coupled to the indicators and configured to provide data relating to the welding or plasma cutting operation to the indicators.

20 Claims, 5 Drawing Sheets

(56) References Cited

U.S. PATENT DOCUMENTS

| | | |
|---|---|---|
| 2009/0159577 A1* | 6/2009 | Sommerfeld ............ 219/121.55 |
| 2009/0298024 A1 | 12/2009 | Batzler et al. |
| 2010/0044589 A1* | 2/2010 | Garcia et al. .............. 250/492.1 |
| 2010/0051586 A1* | 3/2010 | Guerrina et al. ............ 219/59.1 |
| 2011/0042357 A1* | 2/2011 | Griffin ....................... 219/121.5 |
| 2011/0220616 A1 | 9/2011 | Mehn et al. |
| 2011/0220619 A1 | 9/2011 | Mehn |
| 2011/0272383 A1* | 11/2011 | Jarvis ............................. 219/75 |
| 2012/0122062 A1 | 5/2012 | Yang et al. |

* cited by examiner

DEVICES AND METHODS FOR PROVIDING INFORMATION ON A TORCH

BACKGROUND

The invention relates generally to welding and plasma cutting torches and, more particularly, to devices and methods for providing information on a torch.

Welding is a process that has become increasingly prevalent in various industries and applications. Such processes may be automated in certain contexts, although a large number of applications continue to exist for manual welding operations. In both cases, such welding operations rely on a variety of types of equipment to ensure that the supply of welding consumables (e.g., wire, shielding gas, etc.) is provided to the weld in an appropriate amount at the desired time. For example, metal inert gas (MIG) welding typically relies on a wire feeder to enable a welding wire to reach a welding torch. The wire is continuously fed during welding to provide filler metal. A power source ensures that arc heating is available to melt the filler metal and the underlying base metal.

In applications using a torch, a power supply or another device may provide information corresponding to operation of the torch to an operator. For example, in welding applications, a power supply may display information on a display of the power supply. The displayed information may relate to power levels, component configurations, pressures, temperatures, and so forth. Unfortunately, in such applications, an operator may be physically located remote from the power supply and, therefore, may not have access to the information provided. Accordingly, there is a need in the field for methods and devices that provide an operator with information from a power supply or another device while the operator is at a location remote from the device.

BRIEF DESCRIPTION

In one embodiment, a torch for a welding or plasma cutting operation includes a torch body. The torch also includes indicators coupled to the torch body and control circuitry coupled to the indicators and configured to provide data relating to the welding or plasma cutting operation to the indicators.

In another embodiment, a method for providing guidance to an operator of a welding or plasma cutting torch includes selectively illuminating a first combination of light emitting diodes (LEDs) of the torch to indicate a first parameter. The method also includes selectively illuminating a second combination of LEDs of the torch to indicate a second parameter. Selectively illuminating the first combination of LEDs and selectively illuminating the second combination of LEDs is based at least partly on data received by the torch.

In another embodiment, a welding or plasma cutting torch includes light emitting diodes (LEDs) configured to indicate parameters corresponding to a welding or plasma cutting operation.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
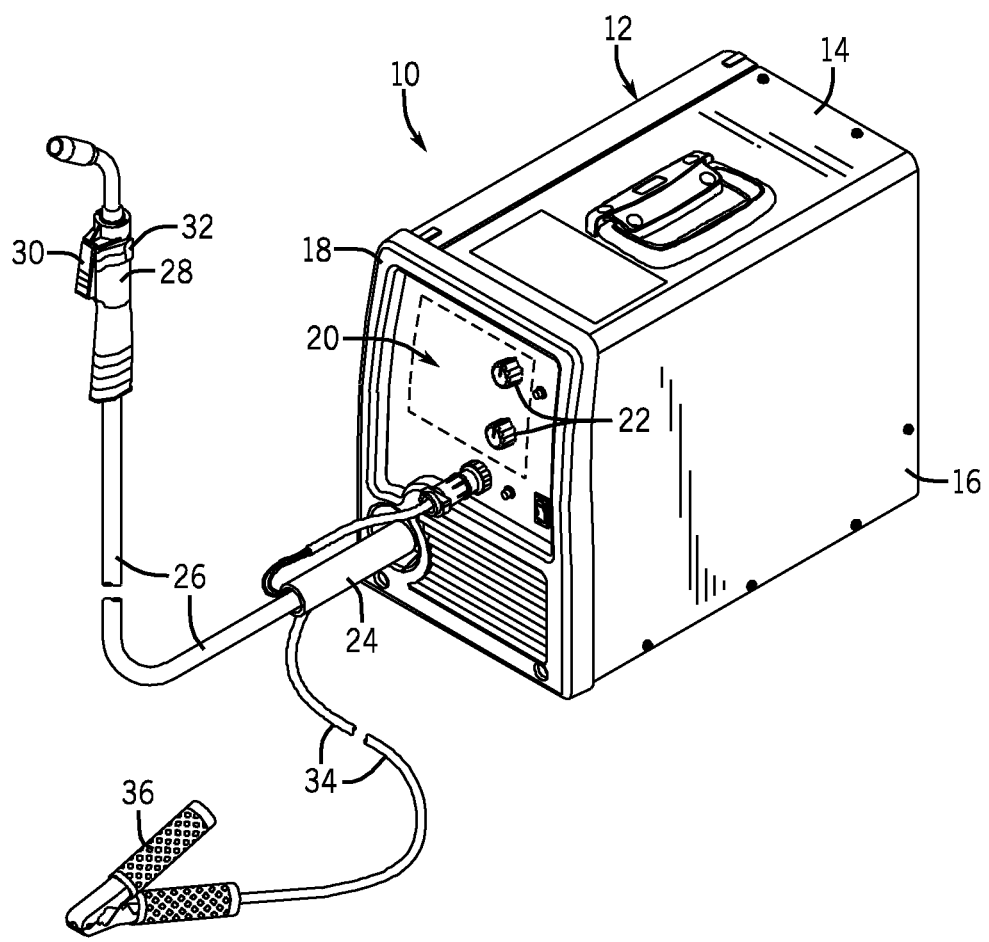
FIG. 1 is a perspective view of an embodiment of a welding power supply employing a welding torch with indicators.

Turning now to the drawings, FIG. 1 is a perspective view of an embodiment of a welding power supply 10 employing a welding torch with indicators. The welding power supply 10 includes a housing 12 having a top panel 14, a side panel 16, and a front panel 18. The top panel 14 may include a handle that facilitates transport of the welding power supply 10 from one location to another by an operator. The front panel 18 includes a control panel 20 adapted to allow an operator to set one or more parameters of the welding process, for example, via knobs 22 (or buttons, touchscreens, etc.). The control panel 20 may also include indicators that provide information to the operator (e.g., voltage, current, power levels, over heating data, arc length, polarity, air pressure, warning data, training data, status data, etc.).

In certain embodiments, the welding power supply 10 includes the functionality of a wire feeder (i.e., internal wire feeder). Such embodiments may include a wire drive configured to receive control signals to drive a wire spool. The wire drive feeds wire for the welding operation. In other embodiments, a separate wire feeder may be used in conjunction with the welding power supply 10 (i.e., external wire feeder). Such a separate wire feeder may also include a wire drive and a wire spool.

A main electrical connector 24 is coupled to the welding power supply 10 via the front panel 18. A cable 26 extends from the main connector 24 to a welding torch 28 configured to establish a welding arc during a welding operation. The welding torch 28 includes a trigger 30 that initiates a welding operation and causes welding wire to be supplied to the welding operation by exposing welding wire when pressed. Furthermore, pressing the trigger 30 may cause a switch in the trigger 30 to be actuated. In other embodiments, wire may be supplied to a welding operation using a spoolgun attached to a welding power supply. In such configurations, the spoolgun may include a trigger to supply welding wire.

The welding torch 28 includes one or more indicators 32 coupled to a body of the welding torch 28 and configured to provide information to the operator (e.g., voltage, current, power levels, over heating data, arc length, polarity, air pressure, warning data, training data, status data, etc.). The indicators 32 may include any suitable type of indicator, such as an audio indicator, a visual indicator, a tactile indicator, and so forth. Moreover, the indicators 32 may include any suitable indicating device, such as a display, a screen, a light-emitting diode (LED), a light, a speaker, and/or a motor. For example, in certain embodiments, the indicators 32 may include a motor configured to provide tactile (e.g., vibration) feedback to the operator. In some embodiments, the indicators 32 may include a speaker configured to provide audible feedback (e.g., sounds) to the operator. Moreover, in other embodiments, the indicators 32 may include a display configured to provide visual (e.g., lights, pictures, illumination, flashing, etc.) feedback to the operator. In some embodiments, the indicators 32 may be a single LED configured to flash a predetermined number of times and/or at a predetermined rate to provide information (e.g., flash twice over a two second period then remain off for five seconds to signify an incorrect configuration, flash three times over a two second period then remain off for five seconds to signify an incorrect polarity, and so forth). It will be appreciated that this same sort of patterns may also be implemented with the audio indicators and the tactile indicators mentioned above. Furthermore, in some embodiments, the indicators 32 may be multiple LEDs arranged in a pattern, arranged in a row, with different color LEDs, and/or arranged in a shape to provide information at the welding torch 28.

In certain embodiments, the indicators 32 may be configured to provide warning data, training data (e.g., coaching data), and/or status data. For example, in embodiments in which the indicators 32 include multiple LEDs, a first portion of the LEDs may be ON (e.g., illuminated) to establish a first pattern of activation and to indicate a first warning. Moreover, a second portion of the LEDs may be ON to establish a second pattern of activation and to indicate a second warning. An example of patterns of activation used to provide warning data is shown in TABLE 1. As may be appreciated, the warning data may include any suitable warnings. For example, the warnings may relate to incorrect polarity, incorrect configuration, pressure too high, pressure too low, temperature too high, temperature too low, input current too low, input current too high, output current too low, output current too high, incorrect voltage, stuck welding wire, and so forth.

TABLE 1

|       | Polarity incorrect | Configuration incorrect | Pressure too high | Temperature too high |
|-------|--------------------|-------------------------|-------------------|----------------------|
| LED_1 | ON                 | ON                      | ON                | ON                   |
| LED_2 | OFF                | ON                      | ON                | ON                   |
| LED_3 | OFF                | OFF                     | ON                | ON                   |
| LED_4 | OFF                | OFF                     | OFF               | ON                   |

By looking at the patterns of activation, an operator may be able to quickly determine that a warning is being provided and may be able to determine what warning data is being provided. For example, if the first LED (e.g., LED_1) is ON, the indicators 32 may indicate that warning data is being provided by the torch 28. In contrast, if the first LED is OFF (e.g., not illuminated) and the second LED (e.g., LED_2) is ON, the indicators 32 may indicate that training data is being provided to the torch 28 as shown in TABLE 2. The training data may include any suitable training data, such as instructions to increase welding speed, decrease welding speed, increase height relative to a workpiece, decrease height relative to a workpiece, change torch angle, change welding wire rate, change current settings, change voltage settings, and so forth.

TABLE 2

|       | Increase speed | Decrease speed | Increase height | Decrease height |
|-------|----------------|----------------|-----------------|-----------------|
| LED_1 | OFF            | OFF            | OFF             | OFF             |
| LED_2 | ON             | ON             | ON              | ON              |

TABLE 2-continued

|       | Increase speed | Decrease speed | Increase height | Decrease height |
|-------|----------------|----------------|-----------------|-----------------|
| LED_3 | OFF            | OFF            | ON              | ON              |
| LED_4 | OFF            | ON             | OFF             | ON              |

Thus, an operator may be able to determine that training data is being received and may adjust their operation based on the indicators 32. As discussed above, the indicators 32 may also indicate that status data is being provided by the torch 28. For example, if the first LED is OFF and the second LED is OFF, the indicators 32 may indicate that status data is being provided to the torch 28 as shown in TABLE 3. The status data may include any suitable status data, such as information about whether power of the power supply is on, a welding mode (e.g., TIG, MIG, stick, etc.), and so forth.

TABLE 3

|       | Power off | TIG welding mode | MIG welding mode | Stick welding mode |
|-------|-----------|------------------|------------------|--------------------|
| LED_1 | OFF       | OFF              | OFF              | OFF                |
| LED_2 | OFF       | OFF              | OFF              | OFF                |
| LED_3 | OFF       | OFF              | ON               | ON                 |
| LED_4 | OFF       | ON               | OFF              | ON                 |

As may be appreciated, the indicators 32 may be configured to provide information in any suitable manner. Therefore, a welding operator using the welding torch 28 may receive an indication at the welding torch 28 that provides the welding operator with information about the welding operation. As may be appreciated, even though the welding torch 28 is illustrated, in other embodiments, a torch for plasma cutting, or a torch for another type of welding-type application, may include the indicators 32 for indicating information at the torch.

A second cable 34 is attached to the welding power supply 10 through an aperture in the front panel 18 and terminates in a clamp 36 that is adapted to clamp to the workpiece during a welding operation to close the circuit between the welding power supply 10, the welding torch 28, and the workpiece. During such an operation, the welding power supply 10 is configured to receive primary power from a primary power supply, such as a power source (e.g., the power grid, engine-generator, etc.), to condition such incoming power, and to output a weld power output appropriate for use in the welding operation. Further, in certain embodiments, the welding power supply 10 may be configured to receive shielding gas, such as from a gas supply cylinder.

Figure 2:
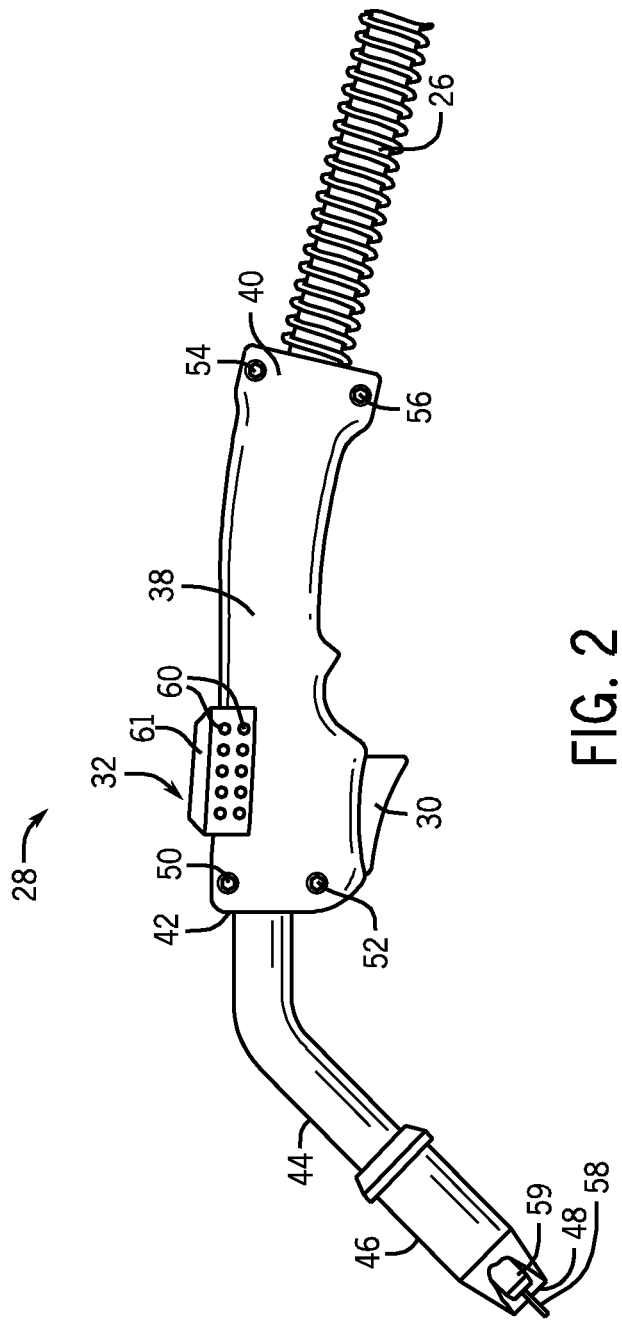
FIG. 2 is a side view of an embodiment of the welding torch of FIG. 1.

FIG. 2 is a side view of an embodiment of the welding torch 28 of FIG. 1. The welding torch 28 includes a handle 38 for a welding operator to hold while performing a weld. At a first end 40, the handle 38 is coupled to the cable 26 where welding consumables are supplied to the weld. Welding consumables generally travel through the handle 38 and exit at a second end 42 opposite from the first end 40. The welding torch 28 includes a neck 44 extending out of the end 42. As such, the neck 44 is coupled between the handle 38 and a nozzle 46. As should be noted, when the trigger 30 is pressed or actuated, welding wire travels through the cable 26, the handle 38, the neck 44, and the nozzle 46, so that the welding wire extends out of an end 48 (i.e., torch tip) of the nozzle 46.

As illustrated, the handle 38 is secured to the neck 44 via fasteners 50 and 52, and to the cable 26 via fasteners 54 and 56. The nozzle 46 is illustrated with a portion of the nozzle 46 removed to show welding wire 58 extending out of a guide or contact tip 59 (or other guiding device). The guide tip 59 is used to guide the welding wire 58 out of the end 48 of the welding torch 28. Although one type of welding torch 28 is illustrated, any suitable type of welding torch may include the indicators 32. For example, a welding torch having the indicators 32 may be configured for shielded metal arc welding (SMAW), gas tungsten arc welding (GTAW), gas metal arc welding (GMAW), and so forth. The indicators 32 include LEDs 60 arranged in a pattern. Although 10 LEDs 60 are illustrated, any suitable number of LEDs 60 may be used, such as 1, 2, 5, 12, 20, and so forth. The LEDs 60 are covered by a covering device 61 that protects the LEDs 60 and facilitates viewing of the LEDs 60. The covering device 61 may be formed using a polymeric material, such as plastic, that is transparent and allows light to pass therethrough. Accordingly, an operator of the welding torch 28 may observe the LEDs 60 to obtain information received from the welding power supply 10.

Figure 3:
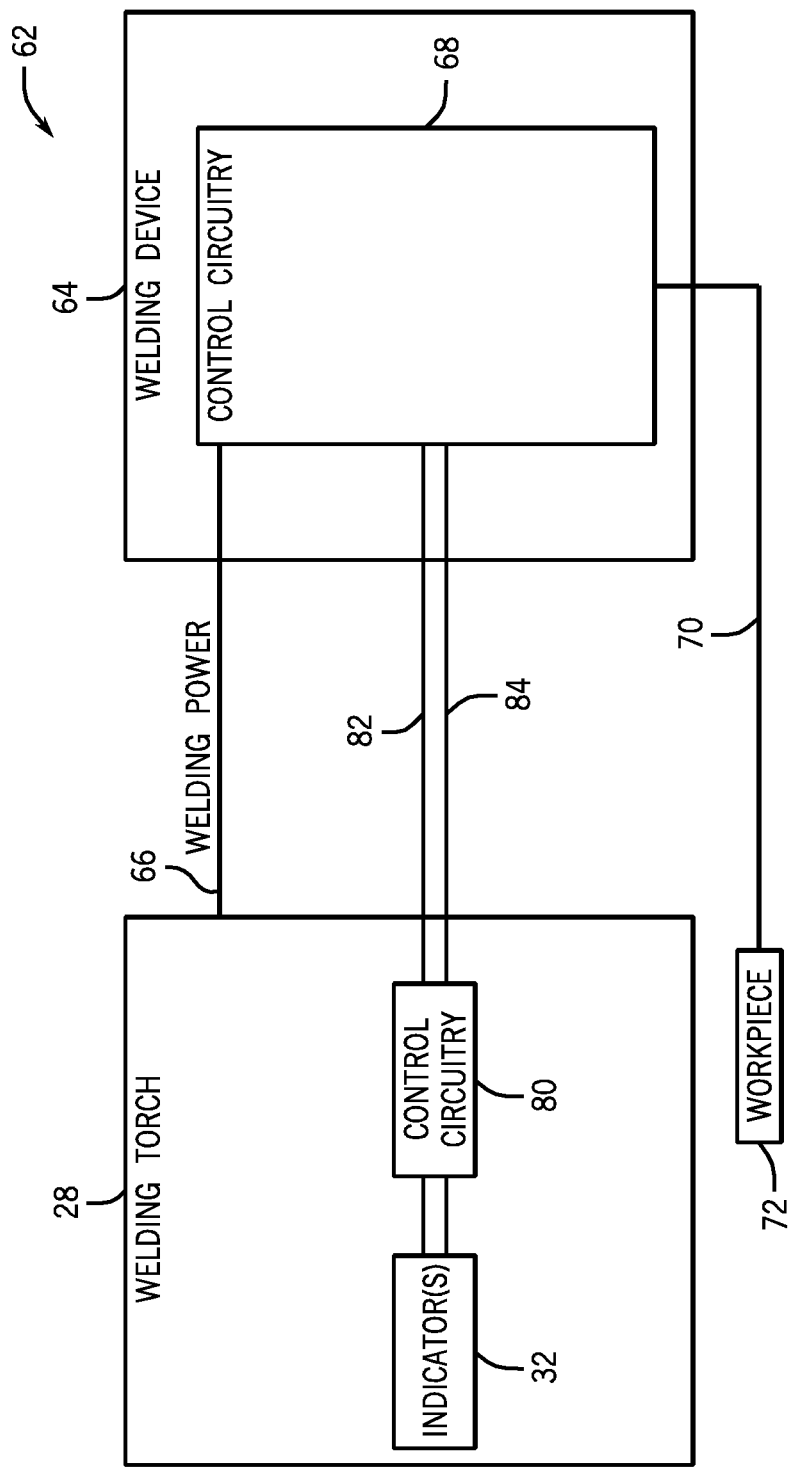
FIG. 3 is a schematic diagram of an embodiment of a welding system having a welding torch with indicators.

FIG. 3 is a schematic diagram of an embodiment of a welding system 62 having the welding torch 28 with the indicators 32. The welding system 62 includes a welding device 64 (e.g., a welding power supply, a wire feeder, a pendant, etc.) configured to provide welding power to the welding torch 28 via a welding power conductor 66. Specifically, the welding device 64 (e.g., the welding power supply 10 of FIG. 1) includes control circuitry 68 configured to provide the welding power to the welding torch 28 and/or to condition the welding power provided to the welding torch 28. The control circuitry 68 is also configured to provide information relating to the welding device 64 to the welding torch 28. The control circuitry 68 is coupled to a conductor 70 which provides a conductive pathway between the control circuitry 68 and a workpiece 72 to facilitate current flow for a welding operation.

The welding torch 28 includes control circuitry 80 coupled to the indicators 32 and configured to provide one or more signals to the indicators 32. In the illustrated embodiment, the conductors 82 and 84 are coupled between the control circuitry 68 of the welding device 64 and the control circuitry 80 of the welding torch 28. In certain embodiments, the control circuitry 80 may provide one or more signals to the indicators 32 based on a voltage difference between the conductors 82 and 84. For example, the control circuitry 80 may receive a first signal (e.g., voltage) based on a first voltage difference between the conductors 82 and 84. Moreover, the control circuitry 80 may receive a second signal (e.g., voltage) based on a second voltage difference between the conductors 82 and 84. In some embodiments, the first signal may indicate a first item of information from the welding device 64. Furthermore, the second signal may indicate a second item of information from the welding device 64. The control circuitry 80 may provide the first and second signals to the indicators 32 to facilitate the indicators 32 providing information to the operator.

The control circuitry 80 of the welding torch 28 may be configured to power the indicators 32 and/or provide suitable signals to drive the indicators 32 to provide information to the welding operator. Accordingly, the welding operator may be able to determine information at the welding torch 28 simply by looking at the indicators 32 on the welding torch 28, even when physically remote from the welding device 64. As may be appreciated, the conductors 66, 70, 82, and 84 may be combined into a single cable and/or may be part of multiple cables. For example, in certain embodiments, the conductors 82 and 84 may be part of a control cable (e.g., 14-pin cable).

Figure 4:
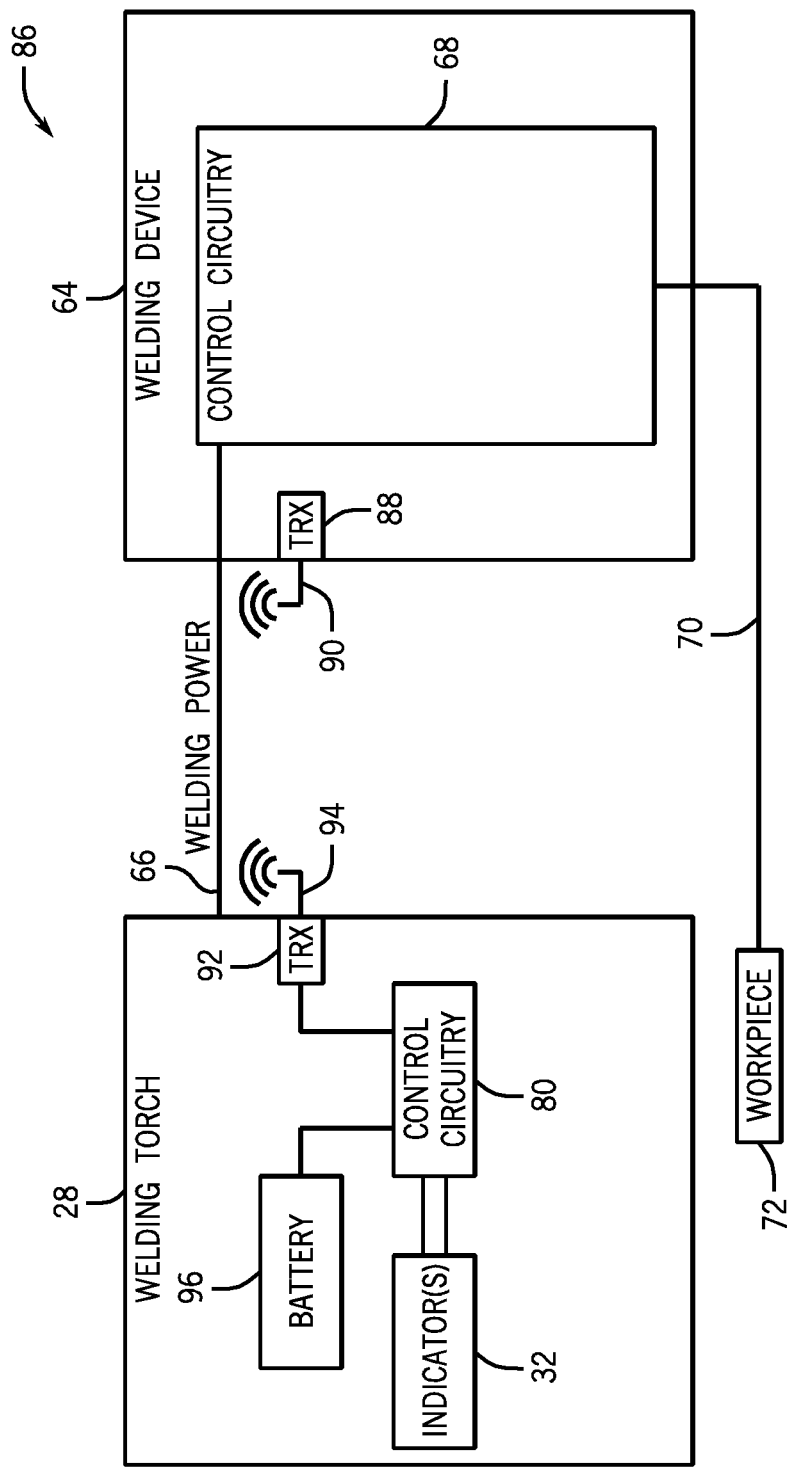
FIG. 4 is a schematic diagram of another embodiment of a welding system having a welding torch with indicators.

FIG. 4 is a schematic diagram of another embodiment of a welding system 86 having the welding torch 28 with the indicators 32. In the illustrated embodiment, the welding device 64 includes a transceiver 88 configured to send and/or receive wireless signals 90. The transceiver 88 of the welding device 64 may be configured to communicate with a transceiver 92 of the welding torch 28 via wireless signals 94 sent to and/or received from the transceiver 92. Accordingly, the transceiver 92 of the welding torch 28 may receive signals from the transceiver 88 of the welding device 64. The received signals may be used to indicate information at the welding torch 28. Furthermore, the transceiver 92 of the welding torch 28 may provide signals to the transceiver 88 of the welding device 64 indicating whether the trigger 30 is actuated. Moreover, a battery 96 is coupled to the control circuitry 80 to provide power to the control circuitry 80, the transceiver 92, and/or the indicators 32. In such a configuration, conductors 82 and 84 may not be included, thereby reducing the number of conductors that extend between the welding device 64 and the welding torch 28.

Figure 5:
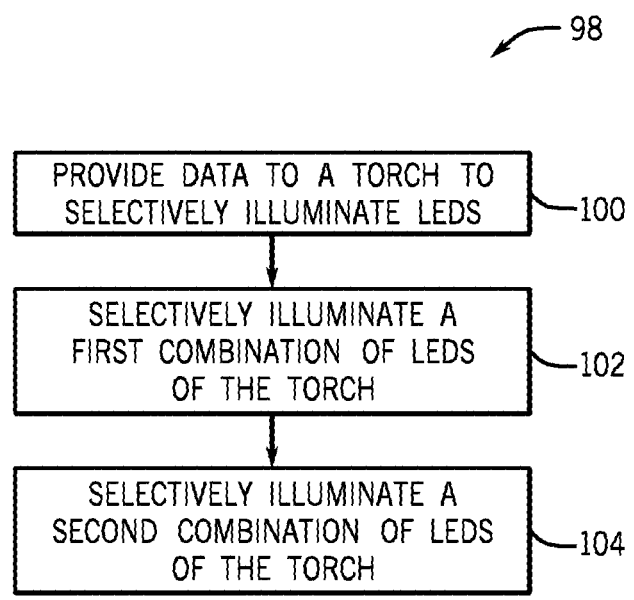
FIG. 5 is a flow chart of an embodiment of a method for providing guidance to an operator of a welding or plasma cutting torch.

FIG. 5 is a flow chart of an embodiment of a method 98 for providing guidance to an operator of a welding or plasma cutting torch (e.g., welding torch 28). In the method 98, data to selectively illuminate various combinations of LEDs of the torch is provided to the torch (block 100). For example, the control circuitry 80 of the welding torch 28 may receive a signal represented by a voltage difference between conductors 82 and 84. As another example, the control circuitry 80 may receive a digital signal wirelessly via the transceiver 92 indicating a first parameter and/or a second parameter to the welding torch 28. The first parameter and/or the second parameter may include warning information, training information, status information, or any other suitable information. In one embodiment, a first combination of LEDs of the torch is selectively illuminated to indicate the first parameter (block 102). Moreover, a second combination of LEDs of the torch is selectively illuminated to indicate the second parameter (block 104).

The devices and methods described herein may be used to provide information to a welding or plasma cutting operator at the torch. The information is provided at the torch so that the operator may receive the information regardless of their location (e.g., even when the operator is not close to the welding device that may be providing power). Moreover, the operator may receive the information prior to and/or during the welding or plasma cutting operation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A torch for a welding or plasma cutting operation, comprising:
a torch body;
a plurality of indicators coupled to the torch body; and
control circuitry coupled to the indicators and configured to provide data relating to the welding or plasma cutting operation to the indicators, wherein a first pattern of activation of the plurality of indicators provides a first indication of a first parameter of the welding or plasma cutting operation and a second pattern of activation of the plurality of indicators provides a second indication of a second parameter of the welding or plasma cutting operation, wherein the first pattern of activation is different from the second pattern of activation, wherein the first pattern of activation and the second pattern of activation each represent a single different welding or plasma cutting parameter, and wherein the first parameter is different from the second parameter.

2. The torch of claim 1, wherein each of the plurality of indicators comprises a light emitting diode.

3. The torch of claim 1, wherein the first and second patterns of activation are formed by activating at least one indicator of the plurality of indicators, deactivating at least one indicator of the plurality of indicators, or some combination thereof.

4. The torch of claim 1, wherein the control circuitry comprises a battery.

5. The torch of claim 1, wherein the control circuitry comprises a wireless receiver.

6. The torch of claim 1, wherein the data comprises warning data.

7. The torch of claim 1, wherein the data comprises training data.

8. The torch of claim 1, wherein the data comprises status data.

9. The torch of claim 1, wherein the data comprises data configured to be displayed on a welding power supply.

10. The torch of claim 1, wherein the data comprises data relating to at least one of over heating, arc length, polarity, and air pressure.

11. A method for providing guidance to an operator of a welding or plasma cutting torch, comprising:
selectively illuminating, via control circuitry of the welding or plasma cutting torch, a first combination of light emitting diodes (LEDs) of the welding or plasma cutting torch to indicate a first parameter; and
selectively illuminating, via the control circuitry of the welding or plasma cutting torch, a second combination of LEDs of the welding or plasma cutting torch to indicate a second parameter;
wherein selectively illuminating the first combination of LEDs and selectively illuminating the second combination of LEDs is based at least partly on data received by the welding or plasma cutting torch, wherein the first combination of LEDs is different from the second combination of LEDs, wherein the first combination of LEDs and the second combination of LEDs each represent a single different welding or plasma cutting parameter, and wherein the first parameter is different from the second parameter.

12. The method of claim 11, comprising providing the data to the welding or plasma cutting torch to selectively illuminate the first and second combinations of LEDs.

13. The method of claim 11, wherein the first and second combinations of LEDs are configured to provide warning information.

14. The method of claim 11, wherein the first and second combinations of LEDs are configured to provide training information.

15. The method of claim 11, wherein the first and second combinations of LEDs are configured to provide status information.

16. A welding or plasma cutting torch comprising:
a plurality of light emitting diodes (LEDs) configured to indicate a plurality of parameters corresponding to a welding or plasma cutting operation, wherein at least one of the plurality of LEDs are configured to indicate two or more of the plurality of parameters; and
control circuitry configured to selectively illuminate the plurality of LEDs in a plurality of combinations to indicate the plurality of parameters corresponding to the welding or plasma cutting operation, wherein each of the plurality of combinations represents a single different parameter of the plurality of parameters.

17. The welding or plasma cutting torch of claim 16, comprising a wireless receiver configured to receive an indication that relates to the parameters corresponding to the welding or plasma cutting operation.

18. The welding or plasma cutting torch of claim 16, comprising a covering device configured to cover and protect the plurality of LEDs.

19. The welding or plasma cutting torch of claim 16, comprising a battery configured to power the plurality of LEDs.

20. The torch of claim 1, wherein the first pattern of activation and the second pattern of activation each use at least one common indicator of the plurality of indicators.

* * * * *